United States Patent [19]

Simonsen et al.

[11] Patent Number: 4,680,974

[45] Date of Patent: Jul. 21, 1987

[54] MASS FLOW METER ON THE CORIOLIS PRINCIPLE

[75] Inventors: Jens K. Simonsen; Hans J. Moos, both of Nordborg, Denmark

[73] Assignee: Danfoss A/S, Nordborg, Denmark

[21] Appl. No.: 826,315

[22] Filed: Feb. 5, 1986

[30] Foreign Application Priority Data

Feb. 15, 1985 [DE] Fed. Rep. of Germany ....... 3505166

[51] Int. Cl.$^4$ ................................................ G01F 1/84
[52] U.S. Cl. ............................................... 73/861.38
[58] Field of Search .................... 73/861.37, 861.38

[56] References Cited

FOREIGN PATENT DOCUMENTS 0119638 9/1984 European Pat. Off. ......... 73/861.35
0165016 9/1983 Japan ................................ 73/861.38

Primary Examiner—Herbert Goldstein
Attorney, Agent, or Firm—Wayne B. Easton; Clayton R. Johnson

[57] ABSTRACT

The invention relates to a mass flow meter operable on the Coriolis principle having two rectilinear juxtaposed parallel arranged measuring tubes mechanically interconnected at their ends. An oscillator between the tubes produces opposite oscillatory movement of the tubes with a harmonic oscillation superimposed on the fundamental oscillation. Sensors between the tubes on opposite sides of the oscillator sense relative movement between the tubes and generate signals corresponding thereto. A circuit responsive to these signals determines resonant frequencies of the fundamental and harmonic oscillations and derives therefrom a correcting value which gives effect to axial stresses in the measuring tubes to determine a corrected mass flow.

13 Claims, 5 Drawing Figures

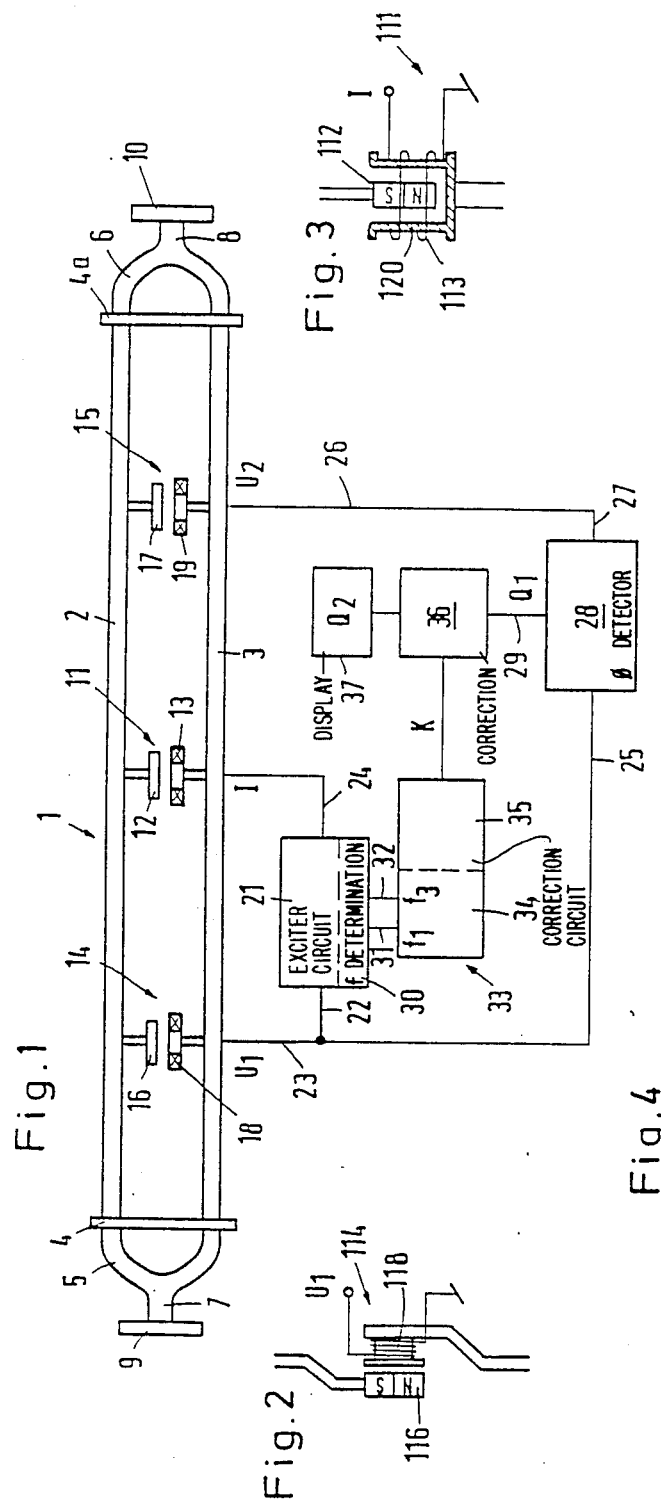
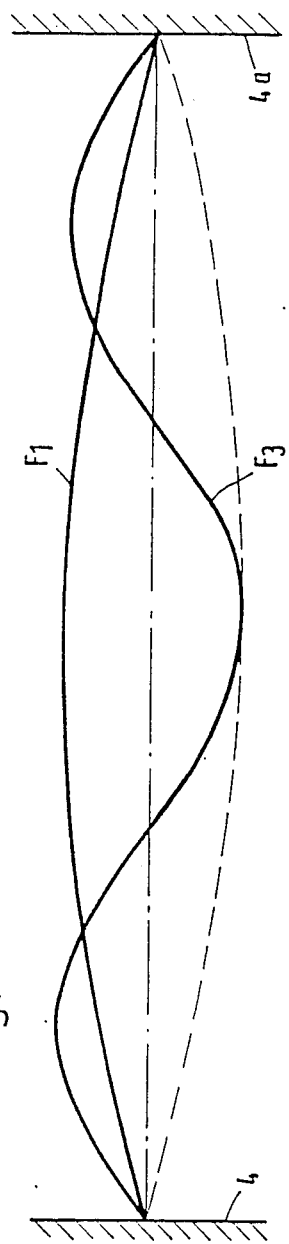
Fig.1 Fig.2 Fig.3 Fig.4

MASS FLOW METER ON THE CORIOLIS PRINCIPLE

The invention relates to a mass flow meter on the Coriolis principle, wherein two juxtaposed measuring tubes are mechanically interconnected at their ends and connected for parallel flow by means of two tube connectors which are connected at their non-confronting ends to a supply or discharge passage having a connector at its end, wherein an oscillator is provided, which sets the measuring tubes into opposite fundamental oscillations, and wherein the measuring tubes are associated at a spacing from the oscillator with sensors for receiving measuring signals from which the flow of mass can be determined.

In a known meter of this kind U.S. Pat. No. 4,491,025 a cylindrical container provided at its ends with connectors for the supply and withdrawal of the medium to be measured and at the middle with dividing walls carries two tubes bent into U shape communicating with the interior of the container at both sides of the dividing walls. The container therefore defines the tube connectors and the supply and withdrawal passages. The adjacent limbs of the U tubes are mechanically interconnected near the container with straps which define the ends of the actual measuring tubes which can be oppositely oscillated by the oscillator. The oscillator is applied at the middle of the curved web of the U. The sensors are disposed at the transition between the curves and the straight limbs of the tube. The particular mass flow can be determined from the difference in the phases of the oscillatory motion at both ends of the U curve. Since the oscillating measuring tubes must have a certain length but project laterally from the container, the meter becomes laterally bulky.

The object of the invention is to provide a mass flow meter of the aforementioned kind that is laterally more compact.

This problem is solved according to the invention in that the measuring tubes are straight and parallel, that the oscillator produces a harmonic superimposed on the fundamental oscillation, and that a frequency determining circuit is provided which determines from a measuring signal the values of the resonance frequencies of the fundamental and harmonic oscillations for the purpose of deriving therefrom a correcting value which takes axial stresses in the measuring tubes into account to determine a corrected mass flow.

In this construction, straight measuring tubes are used instead of bent ones. The lateral extent is therefore small. The measuring tubes can extend parallel to the conduit in which the meter is connected. However, since the tube connectors are now widely spaced from one another, changes in length occur as a result of temperature fluctuations. If, as is usual, the tube connectors and connections form a solid unit which is spacially fixed by being applied to the conduit, the change in length will lead to axial stresses in the measuring tubes, by which the oscillatory behaviour is altered and there will be errors in measurement. Axial stresses can also occur through incorrect clamping of the device and for other reasons. The axial stresses have different effects on the fundamental and harmonic oscillations. Consequently, if excitation is not only by means of a fundamental oscillation but also with a superimposed harmonic, the size of the axial force can be derived from the two frequencies and hence also a correcting value for compensating the measuring error. Thus, despite axial stresses which are inevitable with temperature changes, the mass flow meter is adapted to give corrected values of mass flow.

Preferably, a correcting circuit is provided which forms a quotient from the frequencies of the fundamental and harmonic oscillations, the correcting value being a predetermined function of said quotient. The ratio of the two frequencies is a particularly simple measure of the axial stresses and hence also of the correcting value. This function could even represent a correcting factor which can be particularly easily linked with the measuring result.

In particular, the correcting circuit may comprise a store for receiving date of the predetermined function and automatically make the correcting value available by reason of the determined quotient. The store therefore assumes the function of a table or computing rule. Since the correcting value is given automatically, it is constantly available.

A particularly simple circuit is obtained if an evaluating circuit for determining the mass flow from measuring signals received by two spaced sensors is followed by a multiplication element which is fed with the correcting value determined from the quotient so as to determine the corrected mass flow.

With particular advantage, the harmonic oscillation corresponds to the third harmonic wave. This can readily be excited by the same position as the fundamental oscillation. In addition, compared with other harmonics it has the largest amplitude, so that it can be readily detected if the sensor is suitably placed.

In a preferred form of the invention, the oscillator is disposed substantially in the middle of the straight measuring tubes and at least one sensor is disposed at a spacing of 15 to 25%, preferably about 20%, from the end of the measuring tube. By means of the central arrangement, the fundamental and third harmonic oscillations are excited under optimum conditions. The special position of the sensor ensures that the third harmonic will be detected near its greatest amplitude and the fundamental oscillation will likewise be detectd with an adequate amplitude.

With particular advantage, the oscillator is fed by an exciter circuit comprising an input connected to a sensor, a fundamental oscillation branch provided with an amplifier, a harmonic oscillation branch provided with a selection filter arrangement and an amplifier, and a summation element which precedes the output and receives the amplified signals of both branches. With the aid of the harmonic oscillation branch, the harmonic can be separately treated and amplified so that it can be added in a predetermined ratio to the signal of the fundamental oscillation branch. In this way, one ensures that sufficient excitation energy is available for the harmonic. Otherwise, the preferably adjustable admixing can be so selected that evaluation of the phase displacement of the fundamental frequency for determining the measured flow quantity is not influenced by the harmonic.

It is favourable if the summation element is a summation amplifier with AGC (automatic gain control) regulation. The energising power is therefore so regulated that the measuring signals have a certain size permitting their evaluation.

In addition, each branch should contain a phase correcting element. Small correcting values suffice for the fundamental oscillation. Considerable phase rotations may be necessary for the harmonics, for example a phase reversal for the third harmonic.

Further, it is advisable for a voltage-current transformer to be connected between the summation element and oscillator. In this way, one eliminates phase displacements on account of the inductance of the coils of the oscillator and measurement errors associated therewith.

With particular advantage, the selection filter arrangement comprises a band filter with a selection frequency predetermined by timing pulses and a pulse generator is provided of which the frequency is a multiple of the frequency of the harmonic in the harmonic oscillation branch and is made to follow same. In this way, one ensures that, despite the changes in the harmonic occurring with axial stresses, the selection filter arrangement will always accurately tune its mean frequency to the existing harmonic frequency. This avoids the phase rotations occuring on frequency changes with a solis filter.

In particular, the pulse generator may comprise a phase locking circuit of which the first input is connected by way of a comparator to a section of the harmonic oscillation branch following the amplifier and the second input is connected by way of a 1:N divider to its output. This gives a particularly simple construction for the pulse generator which depends on the harmonic frequency.

Further, it is advisable to have a starting circuit in which the summation element has a further input which receives a square signal by way of a logic circuit when the first input of the phase locking circuit is under voltage and this circuit is not yet locked. This can also initiate excitation of the harmonic so that phase locking occurs after a short time and the selection filter can operate normally.

It is also advantageous if the frequency determining circuit is formed by utilising the exciter circuit and comprises two frequency signal outputs each connected by way of a comparator to a section of the fundamental oscillation branch or harmonic oscillation branch that follows the amplifier. Signals of the frequencies to be determined are simply obtained at the frequency signal outputs.

An example of the invention will now be described in more detail with reference to the drawing, in which:

FIG. 1 is a diagrammatic representation of a mass flow meter with associated circuit;

FIG. 2 shows an embodiment of a sensor;

FIG. 3 shows an embodiment of an oscillator;

FIG. 4 shows the oscillating behaviour of a measuring tube; and

Figure 5:
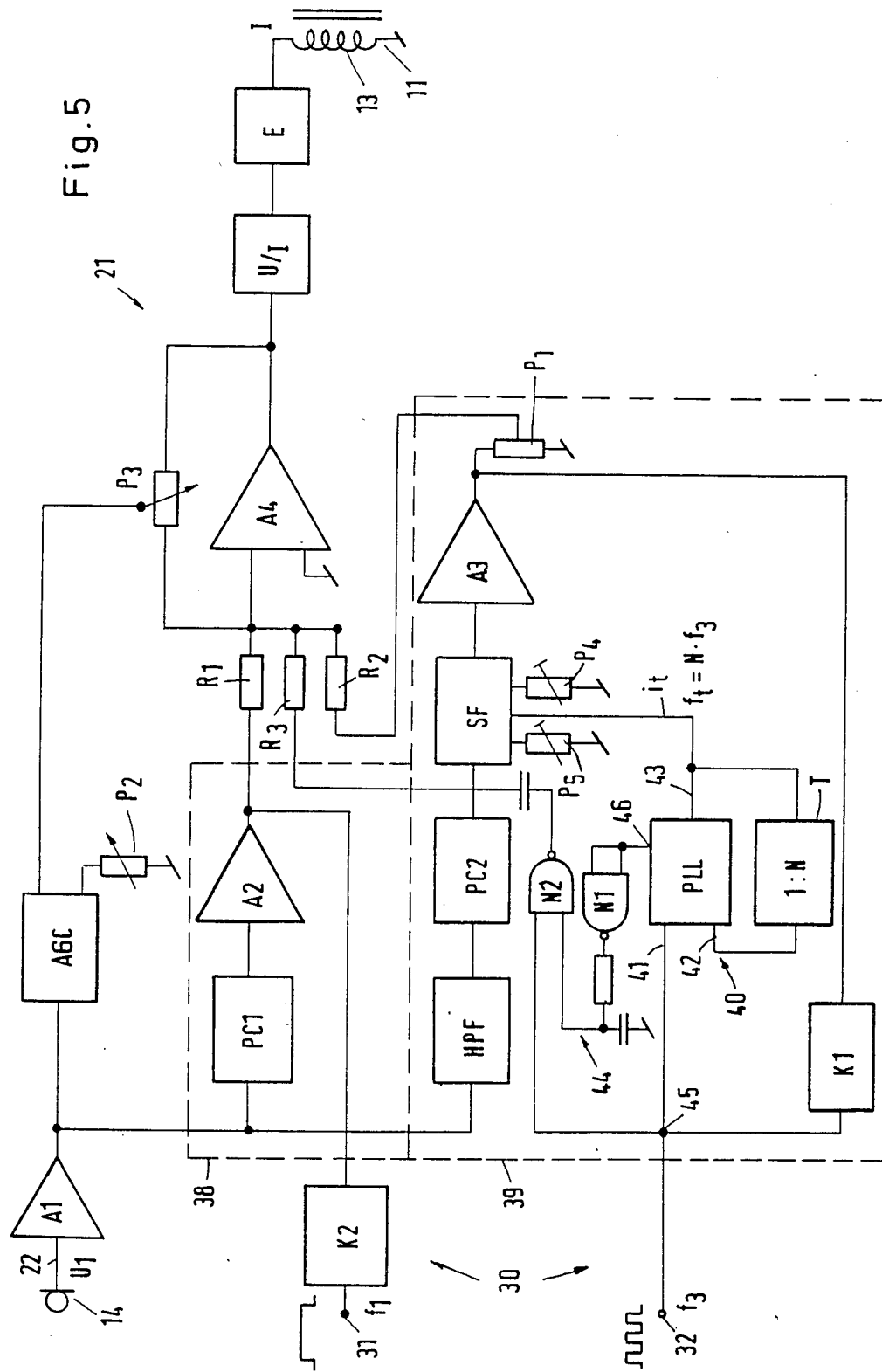
FIG. 5 shows an example of an exciter circuit.

The mass flow meter 1 shown in FIG. 1 comprises two measuring tubes 2 and 3 which are straight and parallel. At their ends, they are mechanically interconnected by cross-struts 4 and 4a. The measuring tubes are connected for parallel flow with the aid of two tube connectors 5 and 6. The passages 7 and 8 serving for supply and withdrawal are provided at their non-confronting ends with an end connector 9 or 10. With its connectors 9 and 10, the meter can therefore be included in a conduit containing the medium to be measured.

Substantially in the middle of the tubes there is an oscillator 11 comprising a permanent magnet 12 connected to the measuring tube 2 and a drive coil 13 connected to the measuring tube 3. At substantially equal spacings in front of and behind this oscillator, there are two sensors 14 and 15 each comprising a permanent magnet 16 or 17 connected to the measuring tube 2 and an induction coil 18 or 19. These have a spacing of about 20% of the measuring tube length from the end of the measuring tube. If a periodic exciter current I is fed to the oscillator, the two measuring tubes 2 and 3 will oscillate in opposite senses. By reason of the oscillating motion, a measuring signal U1 and U2 is induced in the induction coils 18 and 19 of the sensors 14 and 15 that is in the form of a voltage proportional to the velocity of the movements of the measuring tubes relatively to each other.

A particularly effective example of a sensor is shown in FIG. 2. The reference numerals are increased by 100 in relation to FIG. 1. A permanent magnet 116 magnetised as south pole S and north pole N next to each other transversely is opposite an induction coil 118 with an axis parallel to the measuring tubes.

A particularly effective example of oscillator 111 is shown in FIG. 3. A permanent magnet 112 likewise magnetised transversely next to each other as south pole S and north pole N is disposed within a drive coil 113 consisting of a carrier 120 of non-magnetisable material.

An exciter circuit 21 to be explained in more detail in conjunction with FIG. 5 receives the measuring signal $U_1$ at its input 22 by way of a conduit 23 and delivers the exciter current I to the oscillator 11 by way of its output conduit 24. The exciter circuit 21 is such that the exciter current brings the measuring tubes into resonance in regard to the fundamental oscillation $F_1$ and their third harmonic $F_3$, as diagrammatically shown in FIG. 4. The fundamental oscillation $F_1$ of each measuring tube occurs between the full line $F_1$ and the broken line. The amplitude of the third harmonic $F_3$ is considerably less than shown and superimposed on the fundamental oscillation. The measuring signal $U_1$ is fed to the one input 25 and the measuring signal $U_2$ by way of a conduit 26 to the other input 27 of a phase detector 28 which, by reason of the phase displacement of the fundamental oscillation in both measuring signals delivers an uncorrected flow value $Q_1$ at its output 29. This is based on the known fact that, by reason of the Coriolis force, the mass of the medium flowing through the measuring tubes displaces the phase of the tube oscillations initiated by the oscillator 11 over the tube length. The phase displacement is most easily determined in that the time difference between the occurrence of the zero points is found in both measuring signals $U_1$ and $U_2$. This is proportional to the uncorrected value $Q_1$ of the mass flow.

By reason of temperature fluctuations or solely its clamping, the meter clamped in position by its connectors 9 and 10 undergoes axial loading. The axial stresses caused thereby likewise lead to a change in the oscillating behaviour, so that the uncorrected flow$Q_1$ is in error. For this reason, a part of the exciter circuit 21 forms a frequency determining circuit 30 which makes available at the outputs 31 and 32 the determined resonance frequencies $f_1$ and $f_3$ for the fundamental oscillation and third harmonic. The two frequencies are fed to a correcting circuit 33 which forms a quotient from these frequencies $f_1$ and $f_3$ in a first section 34. By reason of this quotient, a data stor 35 is given a correcting factor k which is transmitted to a multiplication element 36. Accordingly, the corrected flow $Q_2 = k \times Q_1$ can be indicated in a display unit 37 or otherwise processed. The upper harmonics are here designated with an ordinate which is referred to as a fundamental oscillation with the ordinate 1. By reason of the temperature and the cross-section of the measuring tubes, the resonance frequencies of these oscillations are not necessarily in a precise whole number relationship to each other.

The construction of the exciter circuit is evident from FIG. 5. Together with the measuring tube system, it forms oscillator means of which the tube system represents the resonance circuit and the exciter circuit gives the required loop amplification and feedback. As a result, the system automatically sets itself to the resonance frequencies of the tube system. It is therefore possible to resonate the tube system simultaneously with the resonance frequencies $f_1$ and $f_3$ of the fundamental and harmonic oscillations. The measuring signal $U_1$ is fed by way of a pre-amplifier A1 to a fundamental oscillating branch 38 and a harmonic oscillation branch 39. The fundamental oscillation branch 38 comprises a phase correcting ciruit PC1 and an amplifer A2. Since the fundamental oscillation in the measuring signal $U_1$ is substantially in phase with the fundamental oscillation in the exciter current I, Only a slight correction is necessary in the phase correcting circuit PC1. The harmonic oscillation branch 39 comprises a high pass filter HPF, a phase correcting circuit PC2, a selection filter SF and an amplifier A3. The measuring signal $U_1$ contains the third harmonic out of phase with the harmonic in the exciter current I. For this reason, the phase correcting circuit PC2 effects a phase reversal. The output signal of branch 38 is fed by way of a summation resistor R1 to a summation amplifier A4 to which there is also fed by way of a summation resistor R2 the output signal of branch 39 which is tapped at a potentiometer P1 so as to select the ratio of fundamental oscillation and harmonic in the output signal in such a way, that on the one hand a marked third harmonic is present in the measuring tube but on the other hand the evaluation of the phase position of the fundamental oscillation is not affected in the phase detector 28. The measuring signal $U_1$ amplified in the preamplifier A1 is also fed to an automatic amplifying regulator AGC which compares the amplitude of the amplified measuring signal with a desired value settable at a potentiometer P2 and, depending thereon, so regulates the amplification of the summation amplifier A4 that, as is diagrammatically illustrated by a potentiotmeter P3 in the return circuit, the measuring signal amplitude corresponds to the desired value. The output value of the summation amplifier A4 is fed by way of a voltage-current transformer U/I and a terminal stage E to the oscillator 11 as current I.

In order that the harmonic, in this case the third, can be filtered out cleanly, the high pass filter HPF which blocks for lower frequencies is supplemented by the selection filter SF of which the mean frequency determining the filtering function is determined by timing pulses $i_t$ which are produced by a pulse generator 40 and supplied by way of a line 41 at a pulse frequency $f_t$ n times the harmonic frequency $f_3$. For this purpose, the one input 41 of a phase locking circuit PLL is connected by way of a comparator K1, which herein is functionally equivalent to a Schmidt trigger to the output of amplifier A3 of the harmonic oscillation branch 39 and the second input 42 is connected by way of a divider T to the output 43 of the phase locking circuit. The latter conventionally consists of the series circuit of a phase comparator, a low pass filter and a voltage-controlled oscillator. The pulse frequency $f_t$ is a whole number multiple of the harmonic frequency $f_3$. N can for example have the value 64. With the aid of potentiometers P4 and P5, the selection filter SF can additionally be set. It is a so-called tracking filter, for example of type MF 10 by Messrs. National. Because the mean frequency of the selection filter SF follows the resonance frequency $f_3$ of the harmonic, one ensures that the filter is very accurately tuned to this frequency $f_3$ i.e. the third harmonic is amplified whereas all other frequencies are heavily damped.

A starter circuit A4 comprises a logic circuit 44 with two NAND elements N1 and N2. The NAND element N2 feeds the summation amplifier A4 by way of a third summation resistor R3 with randomly occurring square pulses whenever square pulses are present at the output 45 of comparator K1 and it is simultaneously indicated by the occurrence of a signal 0 at a further output 46 of the phase locking circuit PLL that no phase locking has as yet taken place. On the other hand, if the signal 1 occurs at output 46 on locking, i.e. during normal operation, the NAND element N2 remains blocked. The irregularly occuring square pulses produce an oscillation at varying frequencies. By reason of the construction of the exciter circuit 21, the fundamental and third harmonic oscillations will soon predominate, so that normal operating conditions are rapidly attained.

In such an exciter circuit 21, the frequency determining circuit 30 can have a very simple construction. The output 31 need merely be connected by way of a comparator K2 to the output of amplifier A2 in the fundamental oscillation branch 38 and the output 32 to the output 45 of the comparator K1 of the harmonic oscillation branch 39. Square pulses of resonance frequency $f_1$ of the fundamental oscillation will then occur at output 31 and square pulses of the resonance frequency $f_3$ of the third harmonic at output 32.

The function for determining the correcting factor k is easily determined experimentally in the following manner. First, in two attempts one ascertains the resonance frequencies for the fundamental and harmonic oscillations in dependence on the axial force loading the measuring tubes, the axial force preferably being standardised to Euler's bending force. This shows that both frequencies change but the resonance frequency of the fundamental oscillation much more so than that of the harmonic. If one interlinks these two frequencies in any formula, for example by forming a ratio, one obtains a clear relationship to the instantaneous axial loading condition. If in a further test series, the axial force is varied at constant mass flow, one obtains—starting from the unloaded condition—a correcting factor k which depends on the axial force. With the aid of both tests, one can therefore interlink this correcting factor and the two resonance frequencies in a function. This function may be stored in the store 35.

Instead of the correcting factor k, one can use an additive correcting value if the correcting circuit 33 is fed with the value for the uncorrected flow $Q_1$.

To determine the axial force and the correcting value dependent thereon, one can also use the resonance frequencies of oscillations other than the fundamental or third harmonic. In particular, one can use the second harmonic for this purpose but this requires excitation at a position other than the middle and thus a higher excitation energy. At higher harmonics, one has to make do with smaller oscillating amplitudes.

We claim:

1. A mass flow meter operable on the Coriolis principle, comprising, two rectilinear juxtaposed parallel arranged tubes mechanically interconnected at their ends, wye tube fittings connecting adjacent ends of said tubes to provide for connections to supply and discharge pipes and for parallel flow through said tubes, oscillator means between said tubes for producing opposite oscillatory movement of said tubes with a harmonic oscillation superimposed on the fundamental oscillation, first and second sensor means between and at opposite ends of said tubes and spaced from said oscillator means for sensing relative movement between said tubes and generating first and second signals corresponding thereto, means responsive to said first and second signals for generating a first value of mass flow, frequency determining circuit means responsive to said first signal for determining the resonant frequencies of said fundamental and harmonic oscillations and for deriving therefrom a correcting value which (gives effect to) is a measure of axial stresses in said measuring tubes and means for applying said correcting value to said first value to determine a corrected mass flow.

2. A meter according to claim 1 including a correcting circuit which forms a quotient from said resonant frequencies of said fundamental and harmonic oscillations, said correcting value being a predetermined function of said quotient.

3. A meter according to claim 2 wherein said correcting circuit includes a store for receiving data of said predetermined function and generates said correcting value from said determined quotient.

4. A meter according to claim 1 characterized in that said harmonic oscillation corresponds to the third harmonic wave.

5. A meter according to claim 1 wherein said oscillater means is disposed substantially midway between the ends of said tubes, and said first sensor means being positioned approximately one-fifth the length of said tubes from one end thereof.

6. A meter according to claim 1 wherein said circuit means includes exciter circuit means for driving said oscillator means having an input connected to said first sensor means, said exciter circuit means having fundamental and harmonic oscillation branches, said harmonic oscillation branch having a selection filter arrangement and amplifier means for selecting said resonant frequency of said harmonic oscillations, and a summation element connected to said oscillator means which receives amplified signals of both of said branches.

7. A meter according to claim 6 characterized in that said summation element is a summation amplifier with AGC regulation.

8. A meter according to claim 6 characterized in that said fundamental oscillation branch has phase correcting means to set said exciter circuit means in phase with said first signal, and said harmonic oscillation branch has phase reversal means to set said harmonic oscillation branch in phase with said harmonic oscillations of said first signal.

9. A meter according to claim 6 including a voltagecurrent transformer connected between said summation element and said oscillator means.

10. A meter according to claim 6 wherein said selection filter arrangement includes a band filter with a selection frequency predetermined by timing pulses, and a pulse generator for generating said timing pulses having a timing frequency which is a multiple of the frequency of the harmonic in said harmonic oscillation branch.

11. A meter according to claim 10 including amplifier means for the output of said harmonic oscillation branch, said pulse generator including a phase locking circuit having first and second inputs and an output, and a 1:N divider between said output and second input.

12. A meter according to claim 11 having a starting circuit including logic circuit means connected to said phase locking circuit, further input means for said summation element, said logic circuit means transmitting a square signal to said further input means when said phase locking circuit is under voltage and this circuit is not yet locked.

13. A meter according to claim 6 wherein said frequency determining circuit has two frequency signal outputs, and means connecting said outputs to said fundamental oscillation branch and said harmonic oscillation branch.

* * * * *